March 29, 1938.   F. W. MERRILL   2,112,741
SPEED REGULATION
Filed March 12, 1937
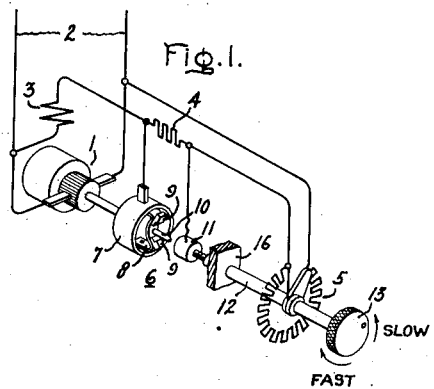
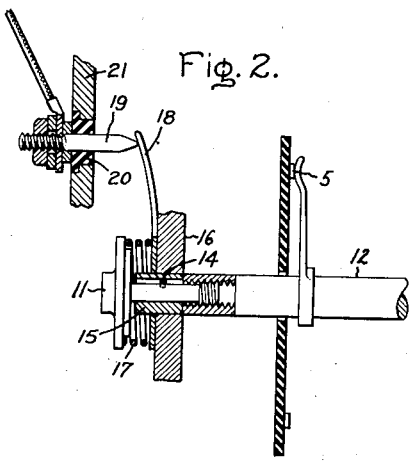
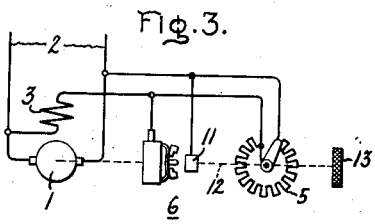
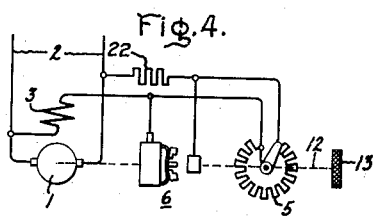
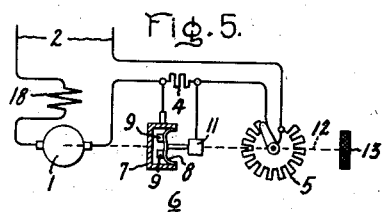
Inventor:
Frank W. Merrill,
by Harry E. Dunham
His Attorney.

Patented Mar. 29, 1938

2,112,741

UNITED STATES PATENT OFFICE 2,112,741

SPEED REGULATION

Frank W. Merrill, Fort Wayne, Ind., assignor to General Electric Company, a corporation of New York Application March 12, 1937, Serial No. 130,502

9 Claims. (Cl. 171—229)

My invention relates to speed regulation and more particularly to improvements in the automatic speed regulation of electric motors.

A well-known device for automatically regulating the speed of an electric motor, especially in the fractional horse-power sizes, is a contact governor. The important elements of such a governor are a set of contacts, a spring, and a weight or system of weights. The contacts are actuated by the spring and weight in such a way that they are operable at any desired normal speed of the motor. That is to say, they close if the speed passes through normal in one direction and they open if the speed passes through normal in the opposite direction. These contacts are connected to control the effective value of an impedance, usually by connecting them across a resistance. This resistance is so connected with respect to the motor that its effective value controls the motor speed.

Such a governor is well adapted to hold the speed of a motor constant as its voltage, load, temperature or other operating conditions vary. However, it is often desirable to be able to adjust between wide limits the speed level held by the governor. The essential feature of this adjustment is that it changes the speed at which the contacts operate. A little reflection, however, will show that the range of this adjustment is limited by the value of the impedance. Thus, one limit of this range occurs when the impedance is continuously short-circuited and thus has a zero effective value. The other limit occurs when the impedance is continuously unshort-circuited and thus has its full value as its effective value. I have found that if the full value of the impedance is sufficiently great to permit the range of speed levels which it is sometimes desirable and often necessary to have, the operation of the entire arrangement becomes unstable. This is because the periodic short-circuiting of such a large impedance causes such large current impulses in the motor that its speed fluctuates violently and rapidly.

This condition can be improved by varying the absolute value of the impedance in the circuit controlled by the governor contacts. In this manner, part of the change in speed level will be due to the change in absolute value of impedance and the rest of the change will be due to the change in setting of the governor. This, however, has the disadvantage that it requires two separate adjustments to be made and for best operation these two adjustments must be properly correlated by a trial and error procedure.

In accordance with my invention, I provide a single adjustable member for simultaneously or coincidentally making a properly correlated change in the setting of the governor and in the absolute value of the impedance. Consequently the governor need only control an impedance large enough to handle normal fluctuations in line voltage, load, temperature, etc. over a wide range of speed levels, and the operation of the system will be entirely stable throughout this entire range.

An object of my invention is to provide a new and improved speed regulating arrangement for electric motors.

Another object of my invention is to provide a new and improved arrangement for extending the stable adjustment range of contact governors.

My invention will be better understood from the following description taken in connection with the accompanying drawing, and its scope will be pointed out in the appended claims.

In the drawing, Fig. 1 is a schematic view of a form of my invention applied to a shunt-type contact governor; Fig. 2 is a detailed sectional view of the speed adjusting means of the governor shown in Fig. 1; Figs. 3 and 4 are modifications of Fig. 1; and Fig. 5 is a further modification showing my invention applied to a series-type contact governor.

Referring now to the drawing and more particularly to Fig. 1, I have shown therein an electric motor 1 connected to be energized from a supply circuit 2. The motor is provided with a shunt field winding 3 in series with which is connected a fixed regulating resistance 4 and a speed adjusting rheostat 5.

The speed of motor 1 is regulated by means of a contact governor 6 which is illustrated by way of example as a simple form of the so-called center contact type. This governor comprises a cup of conducting material 7 mounted so as to be rotated by the motor 1. Across the open end of this cup is fastened a flexible metallic spring member 8 carrying a pair of centrifugal weights 9 on opposite sides of a center contact 10. The natural shape of the spring 8 is such that the contact 10 is moved into the shell when the governor is stationary. However, as the governor is rotated faster and faster the centrifugal force on the weights 9 tends to flex the spring 8 in such a manner as to move the center contact 10 axially outward from the shell 7 and toward a cooperating normally stationary contact 11. Contacts 10 and 11 are connected respectively to the terminals of resistor 4.

The contact 11 is axially movable, so as to adjust the speed setting of the governor, by means of a threaded connection with a shaft 12 provided with a turning knob 13.

The details of this adjusting mechanism are shown more clearly in Fig. 2. Reference to that figure shows that contact 11 may be likened to the head of a screw which is provided with a transverse pin 14 loosely fitted in a slot in a tubular member 15 supported by a member 16. The end of shaft 12 is internally threaded and engages the threads on the shank of the member carrying contact 11. By means of this construction, rotation of the shaft 12 causes axial motion of the contact 11 while preventing its rotation.

A spring 17 is interposed between the plate 16 and a flange on the contact 11. This spring puts a heavy pressure on the threads of the adjustment mechanism and pulls the end of member 12 against the surface of plate 16. This introduces a frictional drag to prevent change of adjustment due to vibration. This spring also prevents lost motion of contacts 11 in an axial direction which would be detrimental to accuracy of regulation. By the use of spring 17, in combination with the threaded engagement of elements 11 and 12 the range of stable axial adjustment of contact 11 is obtained by the rotation of shaft 12.

The electrical connections to the contact 11 are made by a flexible conducting strip 18 inserted between spring 17 and the plate 16. This strip engages a contact post 19 passing through an insulating bushing 20 passing through wall 21 of the regulator housing in the motor end flange.

Referring now again to Fig. 1, it will be noted that rheostat 5 is mounted concentrically with respect to shaft 12 and its adjustable member is fastened to shaft 12 so as to be turned therewith.

The operation of Fig. 1 is as follows:

As shown in the drawing, the speed adjusting knob 13 is set for minimum speed. This is because the rheostat 5 is entirely short-circuited and contact 11 is moved as close to contact 10 as the adjustment will permit. The contacts 10 and 11 being separated shows that the motor speed is below that for which the governor is set. Consequently, if the motor voltage is now increased, or its load decreased, its speed will increase until the contacts of the governor close thereby short-circuiting the resistor 4. This will so reduce the resistance in the shunt field circuit of the motor that its speed will decrease until the governor contacts again separate. The motor speed will thereupon increase again until the governor contacts again close and this cycle will be repeated rapidly and continuously in a vibratory manner thereby holding the particular average speed for which the governor is set.

The resistor 4 may be made relatively low in value so that the speed fluctuations caused by the governor operation will be relatively small and will not produce hunting or unstable operation of the motor. The value of this resistor will preferably be big enough merely to permit the governor to compensate for normal fluctuations in motor voltage, load and temperature.

If now it is desired to increase the speed of the motor, the adjusting knob 13 need merely be turned clockwise. This will simultaneously cause the rheostat 5 to insert increased resistance in the field circuit of the motor and at the same time will move the adjustable contact 11 axially toward the right or outward away from the centrifugally actuated contact 10. Both these changes are in the proper direction to cause an increase in speed. Thus, the speed of a shunt motor is increased by increasing its field resistance and the speed at which the governor contacts go from an open to a closed position or vice versa is also increased by withdrawing the adjustable contact from the centrifugal contact.

By properly correlating the rheostat 5 and the pitch of the threads for moving the adjustable contact 11, the changes in speed caused by the change in rheostat 5 and the movement of adjustable contact 11, when the knob 13 is turned through a given angle, can be made approximately equal. Thus, the resistance 4 has all of its value available for taking care of changes in voltage, temperature, load, etc. at any speed setting of the arrangement and the governor duty remains substantially the same throughout the range of adjustable speed.

Under certain operating conditions, it is not desirable to have the resistance in the field circuit split into two sections 4 and 5.

Fig. 3 is a modification illustrating the application of my invention to a circuit which avoids this. This figure differs from Fig. 1 in that fixed resistance 4 is eliminated and the contacts of governor 6 are connected directly across the rheostat 5. The parts are in their minimum speed positions so that the contact governor is operating across the short-circuited resistor 5. If it is desired to increase the speed, rotation of the knob 13 will simultaneously increase the resistance of rheostat 5 and withdraw the adjustable contact 11 of the governor thereby increasing its speed setting as previously described. In this manner, just enough resistance is connected across the contact governor to permit it to hold the speed at the value for which its contacts are set. The arrangement has the advantage over the conventional arrangement, in which the contacts operate across a fixed resistance, that the regulating resistance is always at the proper value to secure the desired speed whereas with a fixed resistance, its absolute value has to be large enough to permit the maximum desired change in speed levels.

Fig. 4 differs from Fig. 3 merely in the addition of a fixed resistor 22 in the shunt field circuit of the motor. The purpose of this is to produce a shorter time constant of the field circuit thereby improving the operation of the circuit as a whole.

Fig. 5 differs from Fig. 1 in that the motor is provided with a series field winding 18 instead of with a shunt field winding and the governor 6 is of the so-called series type instead of being of the so-called shunt type as in the previous figures. The only difference is that spring 8 and weights 9 are reversed so that the governor tends to be a normally closed switch which opens on overspeed. This is because in a series motor, or in a motor in which the speed is controlled by varying an impedance in the main supply circuit, the speed is reduced by increasing the resistance of the regulated circuit and is increased by decreasing this resistance. Another difference between Fig. 5 and Fig. 1 is that resistances 4 and 5 are connected in the supply circuit 2 instead of in a shunt circuit.

The operation of Fig. 5, however, is exactly the same in principle as that of Fig. 1, the only difference being that the resistance is a maximum for minimum speed and is a minimum for maximum speed. The change in value of resistance 5 for any given change in speed setting of the governor may be such as to account approximately for this change in speed setting so that the resistance 4 need only be large enough to take care of voltage, temperature and load fluctuations throughout the entire adjustable speed range.

While I have shown and described particular embodiments of my invention it will be obvious to those skilled in the art that changes and modifications can be made therein and therefore I aim in the appended claims to cover all such changes and modifications as fall within the true spirit and scope of my invention.

What I claim as new and desire to secure by Letters Patent of the United States, is:—

1. In combination, an electric motor, a contact governor therefor, a fixed speed ratio connection for driving said governor from said motor, a variable impedance connected to control the speed of said motor, and a single adjusting means for simultaneously adjusting the value of said impedance and the speed setting of said governor at which its contacts operate.

2. In combination, an electric motor, a contact governor for said motor, a fixed speed ratio connection for driving said governor from said motor, a rheostat connected to control the speed of said motor, and means for making coincidental changes in the speed setting of said governor at which its contacts operate and in the value of said rheostat which are so correlated that the change in speed tending to result from the change in rheostat setting corresponds to the change in speed caused by the change in the governor setting.

3. In combination, an electric motor, a resistor in a circuit for controlling the speed of said motor, a contact governor connected across said resistor, a fixed speed ratio connection for driving said governor from said motor, a rheostat connected in series with said resistor, and means for coincidentally changing the speed setting of said governor at which its contacts operate and varying the value of said rheostat.

4. In combination, an electric motor, a resistor in a circuit for controlling the speed of said motor, said resistor being of such magnitude that variations in its effective value between zero and full value will produce compensating speed changes in said motor corresponding substantially to the speed changes resulting from normal variations in voltage, temperature and load associated with said motor, a contact governor connected across said resistor, a fixed speed ratio connection for driving said governor from said motor, a rheostat connected in series with said resistor, and means for making coincidental changes in the speed setting of said governor at which its contacts operate and in the value of said rheostat which are so correlated that the change in speed tending to result from the change in rheostat setting corresponds to the change in speed caused by the change in governor setting.

5. In combination, a shunt-connected electric motor, a resistor connected in series with the shunt field winding of said motor, a contact governor connected across said resistor, a rheostat connected in series with said resistor, and means for coincidentally changing the setting of said governor and varying the value of said rheostat.

6. In combination, a series-connected electric motor, a resistor connected in series with said motor for controlling the speed thereof, a contact governor connected across said resistor, a rheostat connected in series with said motor, and means for coincidentally changing the setting of said governor and varying the value of said rheostat.

7. In combination, a contact governor adapted to regulate the speed of an electric motor, said governor having a pair of contacts which open and close at different governor speeds determined by the governor setting, an adjustable impedance adapted to control the speed of said electric motor, and means for making a coincidental change in the speed setting of said governor and in the value of said impedance.

8. In combination, an electric motor, a rheostat connected to control the speed of said motor, a contact governor for said motor connected across said rheostat, and means for coicidentally adjusting said rheostat and the speed setting of said governor.

9. In combination, an electric motor, a resistor and a rheostat connected in series in a circuit to control the speed of said motor, a contact governor for said motor connected across said rheostat, and means for coincidentally adjusting said rheostat and the speed setting of said governor.

FRANK W. MERRILL.